United States Patent [19]
Kresge et al.

[11] Patent Number: 5,266,541
[45] Date of Patent: Nov. 30, 1993

[54] CRYSTALLINE OXIDE MATERIAL

[75] Inventors: Charles T. Kresge, West Chester, Pa.; Wieslaw J. Roth, Sewell, N.J.

[73] Assignee: Mobil Oil Corp., Fairfax, Va.

[21] Appl. No.: 811,383

[22] Filed: Dec. 20, 1991

[51] Int. Cl.$^5$ .................... B01J 29/04; C01B 33/34
[52] U.S. Cl. .................... 502/64; 423/328.2; 423/329.1; 423/718; 502/242
[58] Field of Search .............. 502/64, 242; 423/328.2, 423/329.1, 326, 330, 701, 718

[56] References Cited

U.S. PATENT DOCUMENTS 4,397,825  8/1983  Whittam ..................... 423/277
4,859,648  8/1989  Landis et al. ................ 502/242

Primary Examiner—Carl F. Dees
Attorney, Agent, or Firm—Alexander J. McKillop; Dennis P. Santini; Edward F. Kenehan, Jr.

[57] ABSTRACT

There is provided a crystalline oxide material with a characteristic X-ray diffraction pattern. This material is a layered material, designated MCM-39. This layered material may be swollen, and the swollen material may be pillared.

17 Claims, No Drawings

CRYSTALLINE OXIDE MATERIAL

BACKGROUND

This application relates to a crystalline oxide material, designated herein as MCM-39. MCM-39 is a layered material. This application also relates to swollen and pillared forms of MCM-39, as well as to methods for making these materials. These materials have characteristic X-ray diffraction patterns.

Many layered materials are known which have three-dimensional structures which exhibit their strongest chemical bonding in only two dimensions. In such materials, the stronger chemical bonds are formed in two-dimensional planes and a three-dimensional solid is formed by stacking such planes on top of each other. However, the interactions between the planes are weaker than the chemical bonds holding an individual plane together. The weaker bonds generally arise from interlayer attractions such as Van der Waals forces, electrostatic interactions, and hydrogen bonding. In those situations where the layered structure has electronically neutral sheets interacting with each other solely through Van der Waals forces, a high degree of lubricity is manifested as the planes slide across each other without encountering the energy barriers that arise with strong interlayer bonding. Graphite is an example of such a material. The silicate layers of a number of clay materials are held together by electrostatic attraction mediated by ions located between the layers. In addition, hydrogen bonding interactions can occur directly between complementary sites on adjacent layers, or can be mediated by interlamellar bridging molecules.

Laminated materials such as clays may be modified to increase their surface area. In particular, the distance between the layers can be increased substantially by absorption of various swelling agents such as water, ethylene glycol, amines, ketones, etc., which enter the interlamellar space and push the layers apart. However, the interlamellar spaces of such layered materials tend to collapse when the molecules occupying the space are removed by, for example, exposing the clays to high temperatures. Accordingly, such layered materials having enhanced surface area are not suited for use in chemical processes involving even moderately severe conditions.

The extent of interlayer separation can be estimated by using standard techniques such as X-ray diffraction to determine the basal spacing, also known as "repeat distance" or "d-spacing". These values indicate the distance between, for example, the uppermost margin of one layer with the uppermost margin of its adjoining layer. If the layer thickness is known, the interlayer spacing can be determined by subtracting the layer thickness from the basal spacing.

Various approaches have been taken to provide layered materials of enhanced interlayer distance having thermal stability. Most techniques rely upon the introduction of an inorganic "pillaring" agent between the layers of a layered material. For example, U.S. Pat. No. 4,216,188 incorporated herein by reference discloses a clay which is cross-linked with metal hydroxide prepared from a highly dilute colloidal solution containing fully separated unit layers and a cross-linking agent comprising a colloidal metal hydroxide solution. However, this method requires a highly dilute forming solution of clay (less than 1 g/l) in order to effect full layer separation prior to incorporation of the pillaring species, as well as positively charged species of cross linking agents. U.S. Pat. No. 4,248,739, incorporated herein by reference, relates to stable pillared interlayered clay prepared from smectite clays reacted with cationic metal complexes of metals such as aluminum and zirconium. The resulting products exhibit high interlayer separation and thermal stability.

U.S. Pat. No. 4,176,090, incorporated herein by reference, discloses a clay composition interlayered with polymeric cationic hydroxy metal complexes of metals such as aluminum, zirconium and titanium. Interlayer distances of up to 16A are claimed although only distances restricted to about 9A are exemplified for calcined samples. These distances are essentially unvariable and related to the specific size of the hydroxy metal complex.

Silicon-containing materials are believed to be a highly desirable species of intercalating agents owing to their high thermal stability characteristics. U.S. Pat. No. 4,367,163, incorporated herein by reference, describes a clay intercalated with silica by impregnating a clay substrate with a silicon-containing reactant such as an ionic silicon complex, e.g., silicon acetylacetonate, or a neutral species such as $SiCl_4$. The clay may be swelled prior to or during silicon impregnation with a suitable polar solvent such as methylene chloride, acetone, benzaldehyde, tri- or tetraalkylammonium ions, or dimethylsulfoxide. This method, however, appears to provide only a monolayer of intercalated silica resulting in a product of small spacing between layers, about 2-3 A as determined by X-ray diffraction.

U.S. Pat. No. 4,859,648 describes layered oxide products of high thermal stability and surface area which contain interlayer polymeric oxides such as polymeric silica. These products are prepared by ion exchanging a layered metal oxide, such as layered titanium oxide, with organic cation, to spread the layers apart. A compound such as tetraethylorthosilicate, capable of forming a polymeric oxide, is thereafter introduced between the layers. The resulting product is treated to form polymeric oxide, e.g., by hydrolysis, to produce the layered oxide product. The resulting product may be employed as a catalyst material in the conversion of hydrocarbons.

Crystalline oxides include both naturally occurring and synthetic materials. Examples of such materials include porous solids known as zeolites. The structures of crystalline oxide zeolites may be described as containing corner-sharing tetrahedra having a three-dimensional four-connected net with T-atoms at the vertices of the net and O-atoms near the midpoints of the connecting lines. Further characteristics of certain zeolites are described in *Collection of Simulated XRD Powder Patterns for Zeolites* by Roland von Ballmoos, Butterworth Scientific Limited, 1984.

Synthetic zeolites are often prepared from aqueous reaction mixtures comprising sources of appropriate oxides. Organic directing agents may also be included in the reaction mixture for the purpose of influencing the production of a zeolite having the desired structure. The use of such directing agents is discussed in an article by Lok et al. entitled "The Role of Organic Molecules in Molecular Sieve Synthesis" appearing in *Zeolites.* Vol. 3, October, 1983, pp. 282-291.

After the components of the reaction mixture are properly mixed with one another, the reaction mixture is subjected to appropriate crystallization conditions. Such conditions usually involve heating of the reaction mixture to an elevated temperature possibly with stirring. Room temperature aging of the reaction mixture is also desirable in some instances.

After the crystallization of the reaction mixture is complete, the crystalline product may be recovered from the remainder of the reaction mixture, especially the liquid contents thereof. Such recovery may involve filtering the crystals and washing these crystals with water. However, in order to remove all of the undesired residue of the reaction mixture from the crystals, it is often necessary to subject the crystals to a high temperature calcination e.g., at 500° C., possibly in the presence of oxygen. Such a calcination treatment not only removes water from the crystals, but this treatment also serves to decompose and/or oxidize the residue of the organic directing agent which may be occluded in the pores of the crystals, possibly occupying ion exchange sites therein.

SUMMARY

There is provided an oxide material having the X-ray diffraction pattern comprising the following lines:

| d(A) | $I/I_o$ |
|---|---|
| 9.45 ± 0.18 | vs |
| 6.93 ± 0.14 | w |
| 5.28 ± 0.11 | m |
| 4.55 ± 0.09 | vs |
| 4.06 ± 0.08 | s |
| 3.70 ± 0.07 | vs |
| 3.34 ± 0.07 | vs |
| 3.29 ± 0.07 | m |

The oxide material having this X-ray diffraction is designated herein as MCM-39.

There is also provided a method for preparing MCM-39, said method comprising contacting Nu-6(1) with an acid under conditions sufficient to produce said MCM-39.

There is also provided a layered oxide material having spaced apart layers, said layered oxide material having the X-ray diffraction pattern of the following Table:

| d(A) | $I/I_o$ |
|---|---|
| >20 | vs |
| 6.69–6.97 | w |
| 3.34–3.48 | w |

There is also provided a method for preparing a layered oxide material having spaced apart layers, said method comprising contacting MCM-39 with a swelling agent under sufficient swelling conditions to produce a swollen layered oxide material, wherein said MCM-39 has the X-ray diffraction pattern comprising the following lines:

| d(A) | $I/I_o$ |
|---|---|
| 9.45 ± 0.18 | vs |
| 6.93 ± 0.14 | w |
| 5.28 ± 0.11 | m |
| 4.55 ± 0.09 | vs |
| 4.06 ± 0.08 | s |
| 3.70 ± 0.07 | vs |
| 3.34 ± 0.07 | vs |

-continued

| d(A) | $I/I_o$ |
|---|---|
| 3.29 ± 0.07 | m | and wherein said swollen layered oxide material has the X-ray diffraction pattern comprising the following lines:

| d(A) | $I/I_o$ |
|---|---|
| >20 | vs |
| 6.83 ± 0.14 | w |
| 3.42 ± 0.07 | w |

EMBODIMENTS

MCM-39 may be prepared from a material known as Nu-6(1). Details of the synthesis, composition and X-ray diffraction pattern of Nu-6(1) are set forth in U.S. Pat. No. 4,397,825, the entire disclosure of which is expressly incorporated herein by reference.

The present swollen products may have relatively high interplanar distances (d-spacing), e.g., greater than about 6 Angstroms, e.g., greater than about 10 Angstroms and even exceeding 30 Angstroms. These swollen materials may be converted into pillared materials. These pillared materials, especially silica pillared materials, may be capable of being exposed to severe conditions such as those encountered in calcining, e.g., at temperatures of about 450° C. for about two or more hours, e.g., four hours, in nitrogen or air, without significant decrease, e.g., less than about 10%, in interlayer distance.

Nu-6(1) may be converted to MCM-39 by an acid treatment. MCM-39 has the X-ray diffraction pattern shown in Table 1.

TABLE 1

| d(A) | $I/I_o$ |
|---|---|
| 9.45 ± 0.18 | vs |
| 6.93 ± 0.14 | w |
| 5.28 ± 0.11 | m |
| 4.55 ± 0.09 | vs |
| 4.06 ± 0.08 | s |
| 3.70 ± 0.07 | vs |
| 3.34 ± 0.07 | vs |
| 3.29 ± 0.07 | m |

The values in this Table and like tables presented hereinafter were determined by standard techniques. The radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the diffractometer. From these, the relative intensities, 100 $I/I_o$, where $I_o$ is the intensity of the strongest line or peak, and d (obs.) the interplanar spacing in Angstrom Units (A), corresponding to the recorded lines, were determined. In Tables 1–8, the relative intensities are given in terms of the symbols w=weak, m=medium, s=strong and vs=very strong. In terms of intensities, these may be generally designated as follows:

| w = | 0–20 |
|---|---|
| m = | 20–40 |

-continued

| | |
|---|---|
| s = | 40–60 |
| vs = | 60–100 |

Taking into account certain modifications, this swellable material may be swollen and pillared by methods generally discussed in the aforementioned U.S. Pat. No. 4,859,648, the entire disclosure of which is expressly incorporated herein be reference. The present modifications are discussed hereinafter and include the selection of proper swelling pH and swelling agent.

Upon being swollen with a suitable swelling agent, such as a cetyltrimethylammonium compound, the swollen MCM-39 may have the X-ray diffraction pattern shown in Table 2.

TABLE 2

| d(A) | $I/I_o$ |
|---|---|
| >20.0 | vs |
| 6.83 ± 0.14 | w |
| 3.42 ± 0.07 | w |

Upon being pillared with a suitable polymeric oxide, such as polymeric silica, the swollen MCM-39 material having the X-ray diffraction pattern shown in Table 2 may be converted into a material having the X-ray diffraction pattern shown in Table 3.

TABLE 3

| d(A) | $I/I_o$ |
|---|---|
| >20.0 | vs |
| 6.83 ± 0.14 | w |
| 3.41 ± 0.07 | w |

If the swollen MCM-39 is calcined without prior pillaring another material designated Nu-6(2) is produced. Nu-6(2) is described in the aforementioned U.S. Pat. No. 4,397,825.

Nu-6(1) may be made from an aqueous reaction mixture containing at least one source of an oxide $YO_2$, e.g. silica; at least one source of an oxide $X_2O_3$, e.g. alumina; and a 4,4'-bipyridyl compound. This reaction mixture may have the following molar composition:

| | | |
|---|---|---|
| $YO_2/X_2O_3$ | 10 to 5000 | preferably 20 to 3000 |
| $MOH/YO_2$ | 0 to 0.1 | preferably 0.01 to 0.3 |
| $Z-/X_2O_3$ | 10 to 5000 | preferably 10 to 100 |
| $Q/X_2O_3$ | 0.1 to 5000 | preferably 1 to 500 |
| $H_2O/YO_2$ | 10 to 500 | preferably 15 to 300 |
| $BOH/X_2O_3$ | 0 to 500,000 | preferably 0 to 1000 | where Y is silicon and/or germanium; X is one or more of aluminum, gallium, iron, chromium, vanadium, molybdenum, antimony, arsenic, manganese, or boron; M is an alkali metal or ammonium; Q is the aforesaid 4,4'-bipyridyl compound; and Z- is a strong acid radical present as a salt of M and may be added as a free acid to reduce the free OH$^-$ level to a desired value. M and/or Q can be present as hydroxides or salts or inorganic or organic acids provided the $MOH/YO_2$ requirement is fulfilled. BOH is an aliphatic or aromatic alcohol, preferably an alkanol. While not essential, an alcohol improves crystallization in viscous reaction mixtures.

The bipyridyl may be partially or fully alkylated, e.g. methylated.

The preferred bipyridyl compound is 4,4'-bipyridyl itself.

The preferred alcohol (BOH) is methanol.

The preferred alkali metals (M) are sodium and potassium. The preferred oxide $YO_2$ is silica ($SiO_2$) and the preferred oxide $X_2O_3$ is alumina ($Al_2O_3$).

The silica source can be any of those commonly considered for use in synthesizing zeolites, for example powdered solid silica, silicic acid, colloidal silica, or dissolved silica. Among the powdered silicas usable are precipitated silicas, especially those made by precipitation from an alkali metal silicate solution, such as the type known as "KS 300" made by AKZO, and similar products, aerosol silicas, fume silicas, and silica gels suitably in grades for use in reinforcing pigments for rubber or silicone rubber. Colloidal silicas of various particle sizes may be used, for example 10–15 or 40–50 microns, as sold under the registered trademarks "LUDOX," "NALCOAG," and "SYTON." The usable dissolved silicas include commercially available water glass silicates containing 0.5 to 6.0, especially 2.0 to 4.0 mols of $SiO_2$ per mole of alkali metal oxide, "active" alkali metal silicates as defined in U.K. Pat. No 1,193,254, and silicates made by dissolving silica in an alkali metal hydroxide or quaternary ammonium hydroxide or a mixture thereof.

The alumina source is most conveniently sodium aluminate, but can be or can include aluminum, an aluminum salt of, for example, the chloride, nitrate or sulphate, an aluminum alkoxide or alumina itself, which should preferably be in a hydrated or hydratable form such as colloidal alumina, pseudoboehmite, boehmite, gamma alumina or the alpha or beta trihydrate.

The reaction mixture is reacted usually under autogeneous pressure, optionally with added gas, e.g. nitrogen, at a temperature between 85° and 250° C. until crystals of Nu-6(1) form, which can be from 1 hour to many months depending on the reactant composition and the operating temperature. Agitation is optional, but is preferable since it reduces the reaction time.

At the end of the reaction, the solid phase may be collected on a filter and washed and is then ready for further steps.

Nu-6(1) may have a molar composition with ratio of $X_2O_3$:$YO_2$ of at least 10. To the extent that this portion of Nu-6(1) results in negative charges, Nu 6(1) also has cations to balance the negative charges. More particularly, Nu-6(1) may have a mole ratio of 0.5 to 1.5 $R_2O$:$X_2O_3$, where R is a monovalent cation or 1/m of a cation of valency m. Nu-6(1) may also have water of hydration additional to water when R is H As indicated in the aforementioned U.S. Pat. No. 4,397,825, this additional water ($H_2O$) may be quantified in terms of the molar ratio, $X_2O_3$:o to 2000 $H_2O$.

The freshly prepared Nu-6(1) may also contain nitrogen-containing compounds well in excess of the 1.5 moles set out in the above-mentioned ratio of 0.5 to 1.5 $R_2O$:$X_2O_3$. These nitrogen-containing compounds (Q) can be removed by thermal or oxidative degradation or by displacement by suitably small molecules. Physically trapped nitrogen-containing compounds do not constitute part of the R cations as discussed hereinabove. Thus, Nu-6(1) as made may have the following molar composition:

0 to 1.8 $M_2O$:0.1 to 400 Q:$X_2O_3$:10 to 5000 $Y_2O$:0 to 2000 $H_2O$ wherein M is an alkali metal and/or ammonium and can include hydrogen, and $M_2O+Q$ is equal to or greater than 1.0.

The Nu-6(1) structure ma retain from 0.1 to 0.15 moles of Q per mole of $YO_2$, Q in this case being a 4,4-bipyridyl compound.

The $H_2O$ content of freshly prepared zeolite Nu-6(1) depends on the conditions in which it has been dried after synthesis. Indeed, if dried at temperature at or above 200° C., it converts to zeolite Nu-6(2).

Nu-6-(1) is recognizable by its X-ray diffraction pattern. As indicated in the aforementioned U.S. Pat. No. 4,397,825, Nu-6(1) as prepared is said to have the X-ray diffraction pattern in the following Table.

| d(A) | $I/I_o$ |
|------|------|
| 13.4 | 89 |
| 11.3 | 6 |
| 6.89 | 3 |
| 5.46 | 13 |
| 4.52 | 17 |
| 4.48 | 15 |
| 4.29 | 84 |
| 4.23 | 19 |
| 3.998 | 100 |
| 3.683 | 34 |
| 3.478 | 40 |
| 3.382 | 91 |
| 3.335 | 61 |
| 3.107 | 13 |
| 3.109 | 11 |
| 2.986 | 3 |
| 2.964 | 3 |
| 2.484 | 17 |

The layers of MCM-39 may have the same molar $X_2O_3:YO_2$ ratio as the Nu-6(1) from which it is prepared. More particularly, for example, the layers of MCM-39 may have a composition involving the molar relationship:

$$X_2O_3:(n)YO_2,$$

wherein X is a trivalent element, such as aluminum, boron, iron and/or gallium, preferably aluminum, Y is a tetravalent element such as silicon and/or germanium, preferably silicon, and n is at least about 10, usually from about 20 to about 1000, and more usually from about 20 to about 70.

To the extent that the layers of MCM-39 have negative charges, these negative charges are balanced with cations. Thus, as with Nu-6(1), MCM-39 may have a mole ratio, expressed in terms of moles of oxides, of 0.5 to 1.5 $R_2O:X_2O_3$, where R is a monovalent cation or 1/m of a cation of valency m.

The pillared form of MCM-3 adsorbs significant amounts of commonly used test adsorbate materials, i.e., cyclohexane, n-hexane and water. Adsorption capacities for the pillared MCM-39, especially silica pillared MCM-39, may range at room temperature as follows:

| Adsorbate | Capacity, Wt. Percent |
|-----------|----------------------|
| n-hexane | 10–40 |
| cyclohexane | 10–40 |
| water | 10–40 | wherein cyclohexane and n-hexane sorption are measured at 20 Torr and water sorption is measured at 12 Torr.

NU-6(1) may be converted to MCM-39 by an acid treatment. The acid used to treat Nu-6(1) may be a mineral or other strong acid such as hydrochloric acid, sulfuric acid, nitric acid, or trifluoroacetic acid. The acid may be used in solution, especially in aqueous solution, having a molar concentration of from about 0.1 M to about 10 M, e.g., from about 0.5 M to about 2.0 M. The duration of contact with acid may be from about 1 hour to about 48 hours. The temperature of the acid treatment may be from ambient to about 100° C. For example, the acid treatment may take place at a temperature of about 90° C. Preferably, the acid treatment is repeated one or more times under the same or different conditions in order to more fully convert Nu-6(1) to MCM-39.

MCM-39 may be initially treated with a swelling agent. Such swelling agents are materials which cause the swellable layers to separate by becoming incorporated into the interspathic region of these layers. The swelling agents are removable by calcination, preferably in an oxidizing atmosphere, whereby the swelling agent becomes decomposed and/or oxidized.

Suitable swelling agents may comprise amines or organic cations, such as quaternary organoammonium or organophosphonium cations, in order to effect an exchange of interspathic cations and/or neutralization of protons. A pH range of 10 to 14, preferably 12.5 to 13.5 is generally employed during treatment with the swelling agent.

MCM-39 is preferably not dried prior to being swollen. This MCM-39 may be in the form of a wet cake having a solids content of less than 30 % by weight, e.g., 25 wt % or less.

The foregoing swelling treatment results in the formation of a layered oxide of enhanced interlayer separation depending upon the size of the organic cation introduced. In one embodiment, a series of organic cation exchanges can be carried out. For example, an organic cation may be exchanged with an organic cation of greater size, thus increasing the interlayer separation in a step-wise fashion. When contact of the layered oxide with the swelling agent is conducted in aqueous medium, water is trapped between the layers of the swollen species.

The organic-swollen species may be treated with a compound capable of conversion, e.g., by hydrolysis, to pillars of an oxide, preferably to a polymeric oxide. Where the treatment involves hydrolysis, this treatment may be carried out using the water already present in organic-swollen material. In this case, the extent of hydrolysis may be modified by varying the extent to which the organic-swollen species is dried prior to addition of the polymeric oxide precursor.

It is preferred that the organic cation deposited between the layers be capable of being removed from the pillared material without substantial disturbance or removal of the interspathic polymeric oxide. For example, organic cations such as cetyltrimethylammonium may be removed by exposure to elevated temperatures, e.g., calcination, in nitrogen or air, or by chemical oxidation preferably after the interspathic polymeric oxide precursor has been converted to the polymeric oxide pillars in order to form the pillared layered product.

These pillared layered products, especially when calcined, exhibit high surface area, e.g., greater than 300 $m^2/g$, and thermal and hydrothermal stability making them highly useful as catalysts or catalytic supports, for hydrocarbon conversion processes, for example, alkylation.

Insertion of the organic cation between the adjoining layers serves to physically separate the layers in such a way as to make the layered material receptive to the interlayer addition of a polymeric oxide precursor. In particular, cetyltrimethylammonium cations have been found useful. These cations are readily incorporated within the interlayer spaces of the layered oxide serving to prop open the layers in such a way as to allow incorporation of the polymeric oxide precursor. The extent of the interlayer spacing ca be controlled by the size of the organoammonium ion employed.

Interspathic oxide pillars, which may be formed between the layers of the propped or swollen oxide material, may include an oxide, preferably a polymeric oxide, of zirconium or titanium or more preferably of an element selected from Group IVB of the Periodic Table (Fischer Scientific Company Cat No. 5-702-10, 1978), other than carbon, i.e., silicon, germanium, tin and lead. Other suitable oxides include those of Group VA, e.g., V, Nb, and Ta, those of Group IIA, e.g., Mg or those of Group IIIB, e.g., B. Most preferably, the pillars include polymeric silica. In addition, the oxide pillars may include an element which provides catalytically active acid sites in the pillars, preferably aluminum.

The oxide pillars are formed from a precursor material which may be introduced between the layers of the organic "propped" species as a cationic or electrically neutral, hydrolyzable compound of the desired elements, e.g., those of Group IVB. The precursor material may be an organometallic compound which is a liquid under ambient conditions. In particular, hydrolyzable compounds, e.g., alkoxides, of the desired elements of the pillars may be utilized as the precursors. Suitable polymeric silica precursor materials include tetraalkylsilicates, e.g., tetrapropylorthosilicate, tetramethylorthosilicate and, most preferably, tetraethylorthosilicate. Where the pillars also include polymeric alumina, a hydrolyzable aluminum compound can be contacted with the organic "propped" species before, after or simultaneously with the contacting of the propped layered oxide with the silicon compound. Preferably, the hydrolyzable aluminum compound employed is an aluminum alkoxide, e.g., aluminum isopropoxide. If the pillars are to include titania, a hydrolyzable titanium compound such as titanium alkoxide, e.g., titanium isopropoxide, may be used.

After calcination to remove the organic propping agent, the final pillared product may contain residual exchangeable cations. Such residual cations in the layered material can be ion exchanged by known methods with other cationic species to provide or alter the catalytic activity of the pillared product. Suitable replacement cations include cesium, cerium, cobalt, nickel, copper, zinc, manganese, platinum, lanthanum, aluminum, ammonium, hydronium and mixtures thereof.

Particular procedures for intercalating layered materials with metal oxide pillars are described in U.S. Pat. Nos. 4,831,005, 4,831,006 and 4,929,587. The entire disclosures of these patents are expressly incorporated herein by reference. U.S. Pat. No. 4,831,005 describes plural treatments with the pillar precursor. U.S. Pat. No. 4,929,587 describes the use of an inert atmosphere, such as nitrogen, to minimize the formation of extralaminar polymeric oxide during the contact with the pillar precursor. U.S. Pat. No. 4,831,006 describes the use of elevated temperatures during the formation of the pillar precursor.

The resulting pillared products may exhibit thermal stability at temperatures of 450° C. or even higher as well as substantial sorption capacities (as much as 10 to 40 wt% for $H_2O$ and $C_6$ hydrocarbon). The pillared products may possess a basal spacing of at least about 30A and surface areas greater than 300 $m^2/g$.

The layered materials described herein can optionally be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition, impregnated therein or intimately physically admixed therewith. Such component can be impregnated in, or on, the layered material such as, for example, by, in the case of platinum, treating the layered material with a solution containing a platinum metal-containing ion. Thus, suitable platinum compounds for this purpose include chloroplatinic acid, platinous chloride and various compounds containing the platinum amine complex.

The layered material may be subjected to thermal treatment, e.g., to decompose organoammonium ions. This thermal treatment is generally performed by heating one of these forms at a temperature of at least about 370° C. for at least 1 minute and generally not longer than 20 hours. While subatmospheric pressure can be employed for the thermal treatment, atmospheric pressure is preferred simply for reasons of convenience.

The swollen materials of the present disclosure are useful as intermediates for preparing the pillared materials described herein. These pillared materials are useful as catalysts, catalyst supports and sorbents.

Prior to its use in catalytic processes described herein, the pillared, layered material catalyst is preferably dehydrated, at least partially. This dehydration can be done by heating the crystals to a temperature in the range of from about 200° C. to about 595° C. in an atmosphere such as air, nitrogen, etc., and at atmospheric, subatmospheric or superatmospheric pressures for between about 30 minutes to about 48 hours. Dehydration can also be performed at room temperature merely by placing the pillared, layered material in a vacuum, but a longer time is required to obtain a sufficient amount of dehydration.

The catalyst can be shaped into a wide variety of particle sizes. Generally speaking, the particles can be in the form of a powder, a granule, or a molded product such as an extrudate having a particle size sufficient to pass through a 2 mesh (Tyler) screen and be retained on a 400 mesh (Tyler) screen. In cases where the catalyst is molded, such as by extrusion, the catalyst can be extruded before drying or partially dried and then extruded.

It may be desired to incorporate the catalyst with another material which is resistant to the temperatures and other conditions employed in the catalytic processes described herein. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with layered material, i.e., combined therewith or present during its synthesis, which itself is catalytically active may change the conversion and/or selectivity of the catalyst. Inactive materials suitably serve as diluents to control the amount of conversion so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use, it is desirable to prevent the catalyst from breaking down into powder-like materials. These clay binders have been employed normally only for the purpose of improving the crush strength of the catalyst.

Naturally occurring clays which can be composited with layered materials include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with layered materials also include inorganic oxides, notably alumina.

In addition to the foregoing materials, the layered materials can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

The relative proportions of finely divided layered materials and inorganic oxide matrix vary widely, with the layered material content ranging from about 1 to about 90 percent by weight and more usually, particularly when the composite is prepared in the form of beads, in the range of about 2 to about 80 weight of the composite.

The pillared layered material of the present invention may be useful as a catalyst component for a variety of organic, e.g. hydrcoarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 300° C. to about 550° C., more preferably from about 370° C. to about 500° C., a pressure of from about 0.01 psi to about 2000 psi, more preferably from about 0.1 psi to about 500 psi, and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating isoalkanes, e.g. isobutane, with olefins, e.g. 2-butene, with reaction conditions including a temperature of from about −25° C. to about 400° C., e.g. from about 75° C. to about 200° C., a pressure of from below atmospheric to about 5000 psig, e.g. from about atmospheric to about 1000 psig, a weight hourly space velocity based on olefin of from about 0.01 to about 100, e.g. from about 0.1 to about 20, and a mole ratio of total isoalkane to total olefin of from about 1:2 to about 100:1, e.g. from about 3:1 to about 30:1; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

EXAMPLE 1

120 g of the wet Nu-6(1) material (about 24 g solids), described in U.S. Pat. No. 4,397,825, was contacted three times with 1.25 l of 2 M HCl for 2.5 hr at 90° C. The solid was washed with water until Cl− free and air dried for overnight yielding 25 g of the solid (MCM-39) with an X-ray powder diffraction pattern shown in Table 4.

TABLE 4

| d(A) | I/I$_o$ |
|---|---|
| 9.45 | 100 |
| 6.93 | 12 |
| 5.28 | 23 |
| 4.65 | 17 |
| 4.55 | 98 |
| 4.06 | 56 |
| 3.88 | 17 |
| 3.70 | 98 |
| 3.44 | 14 |
| 3.34 | 77 |
| 3.29 | 35 |

TABLE 4-continued

| d(A) | I/I$_o$ |
|---|---|
| 3.11 | 8 |

A 9 g sample of the solid was calcined at 450° C. for 20 hours. It was determined to have a BET surface area of 49 m$^2$/g and adsorption capacity of 2.9, 2.6 and 3.3 w/w % for water, cyclo-hexane and n-hexane, respectively.

EXAMPLE 2

This Example described the preparation of swollen/pillared MCM-39. 24 g of the solid from Example 1 was mixed with 150 ml of the 29% CTMA-OH. The slurry was gently stirred for overnight at room temperature, filtered, washed with water and air dried for 6 hours. The swollen solid was contacted with 216 g of tetraethylorthosilicate for 24 hr at 80°–115° C. Following filtration it was hydrolyzed with water (75 g of solid, 100 ml of water) for 4 hours and filtered again. This afforded 65 g of the pillared product, which was found to have, after calcination at 450° C. for 12 hours (33 g), the BET surface area of 650 m$^2$/g, and adsorption capacity for water, c-hexane and n-hexane of 25.8, 18.9, and 17.6%, respectively. The pillared product had the X-ray diffraction pattern shown in Table 5.

TABLE 5

| d(A) | I/I$_o$ |
|---|---|
| 40.2 | 100 |
| 6.83 | 8 |
| 3.41 | 7 |

What is claimed is:

1. An oxide material designated MCM-39, having the X-ray diffraction pattern comprising the following lines:

| d(A) | I/I$_o$ |
|---|---|
| 9.45 ± 0.18 | vs |
| 6.93 ± 0.14 | w |
| 5.28 ± 0.11 | m |
| 4.55 ± 0.09 | vs |
| 4.06 ± 0.08 | s |
| 3.70 ± 0.07 | vs |
| 3.34 ± 0.07 | vs |
| 3.29 ± 0.07 | m. |

2. An oxide material according to claim 1 having a composition comprising the following ratio, expressed in terms of moles of oxides:

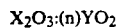

$X_2O_3$:(n)$YO_2$ where X is a trivalent element, Y is a tetravalent element and n is at least 10.

3. An oxide material according to claim 2, wherein X is aluminum and Y is silicon.

4. An oxide material according to claim 2 having a composition comprising the following ratio, expressed in terms of moles of oxides:

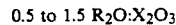

0.5 to 1.5 $R_2O$:$X_2O_3$ where R is a monovalent cation or 1/m of a cation of valency m.

5. A method for preparing MCM-39, said method comprising contacting Nu-6(1) with an acid under conditions sufficient to produce said MCM-39, wherein said MCM-39 is an oxide material having the X-ray diffraction pattern comprising the following lines:

| d(A) | I/I$_o$ |
|---|---|
| 9.45 ± 0.18 | vs |
| 6.93 ± 0.14 | w |
| 5.28 ± 0.11 | m |
| 4.55 ± 0.09 | vs |
| 4.06 ± 0.08 | s |
| 3.70 ± 0.07 | vs |
| 3.34 ± 0.07 | vs |
| 3.29 ± 0.07 | m. |

6. A method according to claim 5, wherein said Nu-6(1) has a molar composition, expressed in terms of moles of oxides, having the following formula:

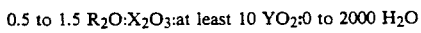

0.5 to 1.5 $R_2O$:$X_2O_3$:at least 10 $YO_2$:0 to 2000 $H_2O$ where R is a monovalent cation or 1/m of a cation of valency m; Y is silicon and/or germanium; X is one or more of aluminum, iron, chromium, vanadium, molybdenum, antimony, arsenic, manganese, gallium, or boron; and $H_2O$ is water of hydration additional to water notionally present when R is H, wherein said Nu-6(1) is prepared by reacting an aqueous reaction mixture containing at least one source of at least one oxide $YO_2$, at least one source of at least one oxide $X_2O_3$, and a 4,4'-bipyridyl compound.

7. A method according to claim 6, wherein said aqueous reaction mixture has the following molar composition:

| | |
|---|---|
| $XO_2/Y_2O_3$ | 10 to 5000 |
| MOH/$XO_2$ | 0 to 1.0 |
| Z—/$Y_2O_3$ | 0 to 5000 |
| Q/$Y_2O_3$ | 0.1 to 5000 |
| $H_2O/XO_2$ | 10 to 500 |
| BOH/$Y_2O_3$ | 0 to 500,000 | wherein X is silicon and/or germanium; Y is one or more of aluminum, gallium, iron, chromium, vanadium, molybdenum, antimony, arsenic, manganese, or boron; M is an alkali metal or ammonium; Q is a 4,4'-bipyridyl compound; Z- is a strong acid radical; and BOH is an aliphatic or aromatic alcohol.

8. A method according to claim 7, wherein Y is aluminum and X is silicon.

9. A method according to claim 8, wherein the 4,4'-bipyridyl compound is 4,4'-bipyridyl.

10. A method according to claim 5, wherein said Nu-6(1) is contacted with an aqueous solution of said acid at a temperature of from ambient to about 100° C. for about 1 hour to about 48 hours, wherein the aqueous acid solution has a molar concentration of from about 0.1 M to about 10 M.

11. A method according to claim 10, wherein said acid which is contacted with said Nu-6(1) is selected from the group consisting of hydrochloric acid, sulfuric acid, nitric acid, and trifluoracetic acid.

12. A method according to claim 10, wherein said acid which is contacted with said Nu-6(1) is hydrochloric acid.

13. A method for preparing a layered oxide material having spaced apart layers, said method comprising contacting MCM-39 with a swelling agent under sufficient swelling conditions to produce a swollen layered oxide material, wherein said MCM-39 has the X-ray diffraction pattern comprising the following lines:

| d(A) | I/I$_o$ |
|---|---|
| 9.45 ± 0.18 | vs |
| 6.93 ± 0.14 | w |
| 5.28 ± 0.11 | m |
| 4.55 ± 0.09 | vs |
| 4.06 ± 0.08 | s |
| 3.70 ± 0.07 | vs |
| 3.34 ± 0.07 | vs |
| 3.29 ± 0.07 | m | and wherein said swollen layered oxide material has the X-ray diffraction pattern comprising the following lines:

| d(A) | I/I$_o$ |
|---|---|
| >20 | vs |
| 6.83 ± 0.14 | w |
| 3.42 ± 0.07 | w. |

14. A method according to claim 13, wherein said swelling agent is a cetyltrimethylammonium compound.

15. A method according to claim 14, further comprising contacting said swollen layered oxide material with a pillaring agent under conditions sufficient to convert said swollen layered oxide material to a pillared layered oxide material.

16. A method according to claim 15, wherein said pillaring agent is tetraethylorthosilicate which is converted to silica pillars by hydrolysis.

17. A method according to claim 13, further comprising contacting said swollen layered oxide material with a pillaring agent under conditions sufficient to convert said swollen layered oxide material to a pillared layered oxide material.

* * * * *